(12) United States Patent
Maruyama et al.

(10) Patent No.: US 7,472,173 B2
(45) Date of Patent: Dec. 30, 2008

(54) REMOTE DATA COPYING AMONG STORAGE SYSTEMS

(75) Inventors: Tetsuya Maruyama, Yokohama (JP); Takashige Iwamura, Yokohama (JP); Shunji Kawamura, Yokohama (JP); Hiroshi Arakawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1042 days.

(21) Appl. No.: 10/849,060

(22) Filed: May 20, 2004

(65) Prior Publication Data
US 2005/0210078 A1 Sep. 22, 2005

(30) Foreign Application Priority Data
Mar. 18, 2004 (JP) .............................. 2004-078341

(51) Int. Cl.
*G16F 15/16* (2006.01)

(52) U.S. Cl. ..................... 709/219; 709/217; 709/218; 709/202; 709/203; 709/204; 711/161; 711/162; 711/6; 711/7; 711/8; 711/9

(58) Field of Classification Search ......... 709/217–219, 709/202–203; 711/6–9, 161–162
See application file for complete search history.

(56) References Cited

U.S. PATENT DOCUMENTS

| | | | |
|---|---|---|---|
| 5,692,155 A * | 11/1997 | Iskiyan et al. ................ | 711/162 |
| 6,052,758 A | 4/2000 | Crockett et al. | |
| 6,148,383 A * | 11/2000 | Micka et al. ................. | 711/162 |
| 6,301,677 B1 | 10/2001 | Squibb | |
| 6,463,501 B1 * | 10/2002 | Kern et al. .................... | 711/100 |
| 6,898,685 B2 * | 5/2005 | Meiri et al. .................. | 711/167 |
| 2005/0005066 A1 | 1/2005 | Nakayama et al. | |
| 2005/0038968 A1 | 2/2005 | Iwamura et al. | |
| 2005/0055523 A1 | 3/2005 | Suisha et al. | |
| 2005/0166023 A1 | 7/2005 | Kasako et al. | |

FOREIGN PATENT DOCUMENTS

JP 2002-149499 5/2002

\* cited by examiner

*Primary Examiner*—Bunjob Jaroenchonwanit
*Assistant Examiner*—Duyen M Doan
(74) *Attorney, Agent, or Firm*—Mattingly, Stanger, Malur & Brundidge, P.C.

(57) ABSTRACT

The present invention provides a method for guaranteeing a data consistency among a plurality of storages and sites, when data transfer is performed by asynchronous remote copying from a site including a plurality of storages.

When writing is made into a first storage system or a second storage system, the storage system that received the writing transfers the write data to the other storage system within the site by synchronous remote copying. At this timing the first storage system gives the write data information for order assurance.

Furthermore, the first or the second storage system transfers the write data and thus given information for order assurance to the third or the fourth storage system by asynchronous remote copying.

Furthermore, the third or the fourth storage system which has received the write data transfers to the other storage system within the same site the write data and information for order assurance by synchronous remote copy.

6 Claims, 18 Drawing Sheets

FIG. 2

JNL INFORMATION (113)

| LUID (201) | SEQ# (202) | DATA (203) | REFLECT FLAG (204) | SEND FLAG (205) |
|---|---|---|---|---|
| 1 | 1 | ………… | 1 | 1 |
| 5 | 2 | ………… | 1 | 0 |
| 11 | 3 | ………… | 0 | 0 |

FIG. 3

PAIR INFORMATION (112)

| SOURCE LU ID (301) | TARGET LU ID (302) | PAIR STATUS (303) | DIFFERENTIAL BMP (304) |
|---|---|---|---|
| 1 | 2 | PAIR | |
| 3 | 4 | | |
| 5 | 6 | | |
| 7 | 8 | | |

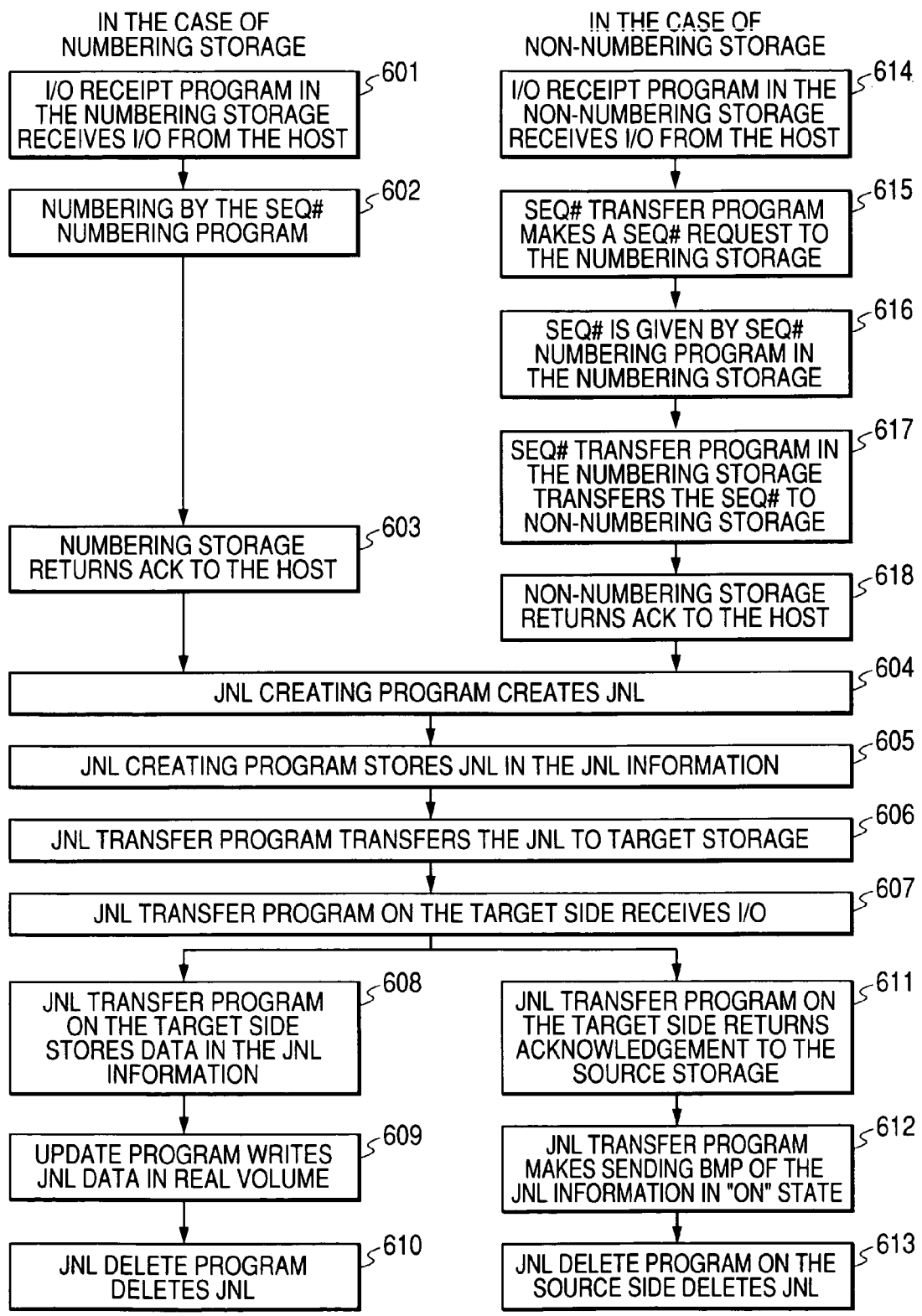

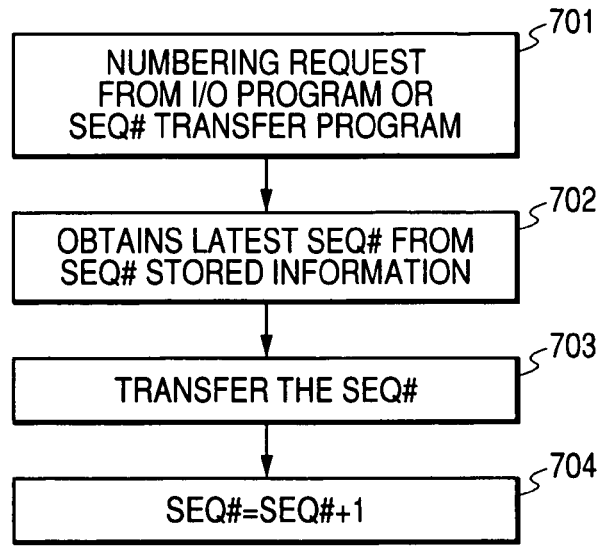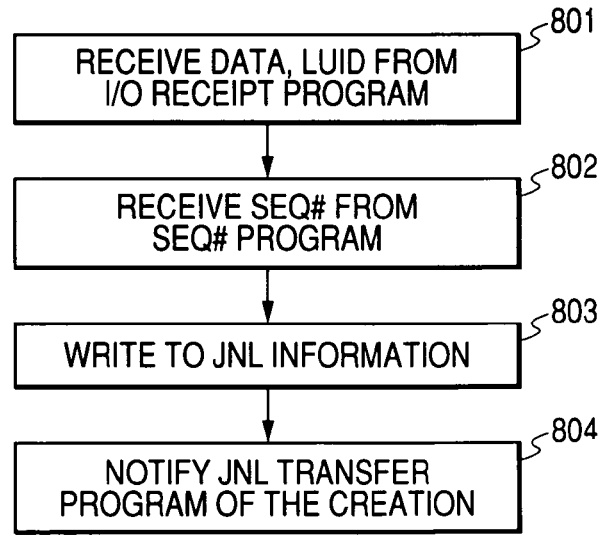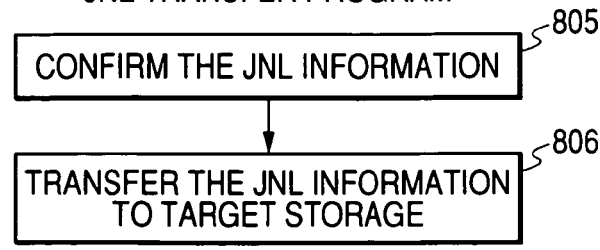

PAIR INFORMATION FOR MIRRORING

| SOURCE LUN | TARGET LUN | PAIR STATUS | DIFFERENTIAL BMP |
|---|---|---|---|
| 1 | 2 | D | |
| 3 | 4 | D | |
| 5 | 6 | D | |
| 7 | 8 | D | |

PAIR INFORMATION FOR ASYNCHRONOUS REMOTE COPY

| SOURCE LUN | TARGET LUN | PAIR STATUS | DIFFERENTIAL BMP |
|---|---|---|---|
| 1 | 2 | D | |
| 3 | 4 | | |
| 5 | 6 | | |
| 7 | 8 | | |

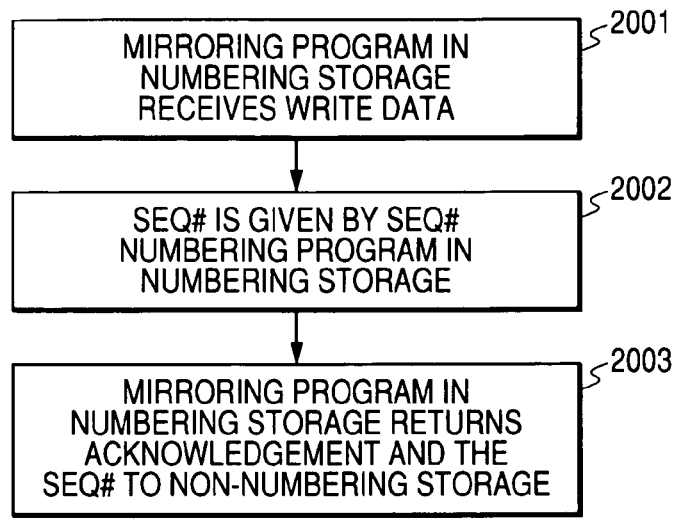
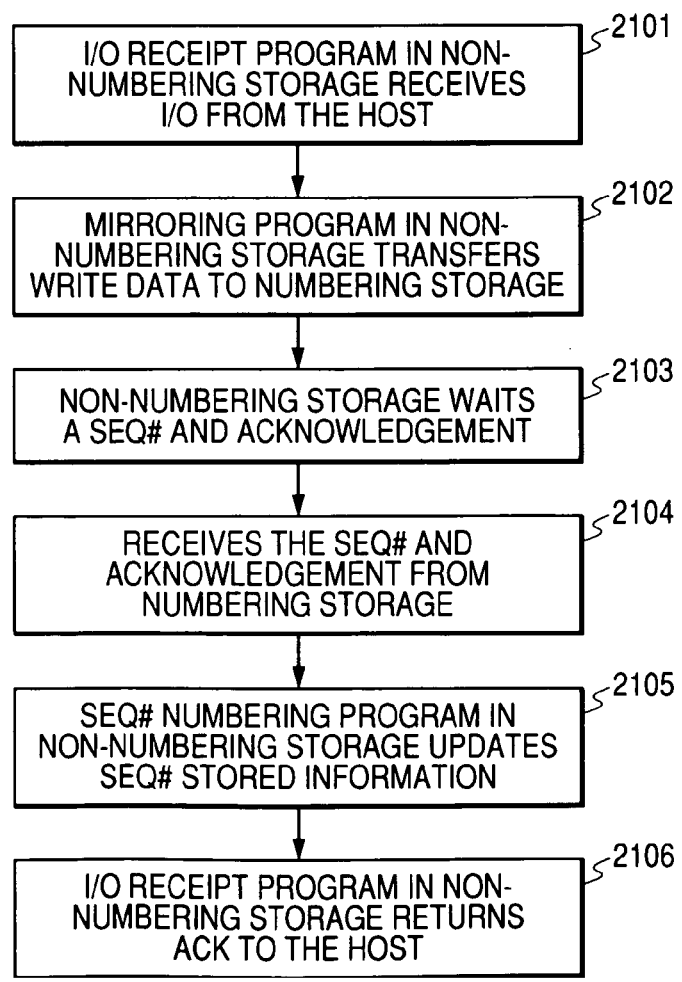

REMOTE DATA COPYING AMONG STORAGE SYSTEMS

CLAIM OF PRIORITY

The present application claims priority from Japanese application no. 2004-078341, filed on Mar. 18, 2004, the content of which is hereby incorporated by reference into this application.

BACKGROUND OF THE INVENTION

The present invention relates to a storage remote copying method in an information processing system in which a plurality of storages are connected via network, and in particular, it relates to a technique for data transfer and disaster recovery.

A system failure in the information processing system including a storage device, due to power failure, fire disaster, earthquake and the like, may cause a temporary halt of operation, data loss and the like. In order to avoid such a situation, a similar information processing system is provided at a remote place where there is no influence from such a fire disaster, earth quake and the like. Then, write data is transferred to that system so that a copy can be prepared. For implementing such a configuration as described above, there exists a technique for transferring data to make a copy, utilizing a network device (hereinafter, referred to as "remote copy").

"Remote copy" means to transfer data to a system including a storage device at a remote location. Accordingly, even when a system at one site goes down due to a disaster, the system can be recovered by data backup, operation take-over and the like at the remote location.

There are two types of "remote copy", i.e., synchronous remote copy and asynchronous remote copy. Specifically, in the synchronous remote copy, in response to a write request from a computer of an information processing system, a storage device of the information processing system completes data transfer to a remote storage, and thereafter gives a response to the write request from the computer. Therefore, in the synchronous remote copy, there is little possibility of data loss due to a system failure, and consistency in data transfer is guaranteed. However, in the case of delay in lines between the storages, I/O delay between the computer and the storage may occur.

On the other hand, in the asynchronous remote copy, upon receipt of writing from the computer, the storage device makes a response at the timing of writing into the storage in itself and does not wait for a response from the data transfer destination at a remote location. With this configuration, I/O performance delay between the computer and the storage device rarely occurs even if a distance between the storage devices is long, the possibility of data loss occurrence becomes higher, comparing to the synchronous remote copy, and data order is not guaranteed.

As for the guarantee in data consistency in the asynchronous remote copy, there is disclosed a method that additional information is attached to the write data, and based on the additional information, sorting of data is carried out in the system at the remote location to guarantee the data consistency (see the Japanese Patent Laid-open Publication No. 2002-149499, hereinafter referred to as "Patent Document 1").

SUMMARY OF THE INVENTION

In the method of the Patent Document 1, data consistency is guaranteed as to writing from one storage device, but this consistency is not guaranteed as to writing among a plurality of storages is not guaranteed.

An object of the present invention is to provide a method and a system for assuring data consistency among a plurality of storages, when data is transferred via asynchronous remote copy from the plurality of storages.

In order to achieve the above object, the present invention provides an information processing system including a first site and a second site, and a storage remote copying method, wherein, the first site includes a first storage connected to a first computer, and a second storage connected to a second computer, the second site includes a third storage, when the first computer performs a first writing into the first storage, the first storage adds order assurance information to the first writing and transfers the first writing with the order assurance information to the third storage, when the second computer performs a second writing into the second storage, the second storage obtains the order assurance information from the first storage, and thereafter, the second storage adds the order assurance information to the second writing and transfers the second writing with the order assurance information to the third storage, and the third storage records into a storage area within the third storage, the first writing and the second writing according to a time sequence based on the order assurance information.

Furthermore, the first site includes the first storage connected to the first computer and the second storage connected to the second computer, the second site includes the third storage and a fourth storage, when the first computer performs the first writing into the first storage, the first storage adds the order assurance information to the first writing and transfers the first writing with the order assurance information to the second storage, and after a completion of transferring to the second storage, the first storage transfers the first writing with the order assurance information to the third storage, when the second computer performs the second writing into the second storage, the second storage carries out a transfer to the first storage, the first storage adds the order assurance information to the second writing, transfers to the second storage, a response of completion of writing into the second storage and the order assurance information, and further transfer is made to the third storage, and the third storage transfers the first and the second writings to the fourth storage, and the third and the fourth storages record the first and the second writings into the storage areas respectively within the storages, in the time sequence based on the order assurance information.

Furthermore, the second storage receives writing from the first storage, which has been written in the first storage, and holds the writing, when a failure occurs in the first storage, a connection is established from the first computer to the second storage, and the second storage gives the order assurance information to the writings from the first computer and the second computer, and records the first and the second writings into the third storage, and the third storage transfers the writings to the fourth storage, and the third and the fourth storages record the writings into the storage areas respectively within the storages, in the time sequence based on the order assurance information.

According to the present invention, a first storage as a source storage gives order assurance information to write data in a unified manner, and thus there is an effect that data consistency can be guaranteed in asynchronous remote copying from a first site to a second site.

BRIEF DESCRIPTION OF THE DRAWINGS

FIG. 2 is a diagram showing contents of JNL information.

FIG. 3 is a diagram showing contents of pair information.

FIG. 6 is a flow diagram schematically showing operations in the first embodiment of the present invention.

FIG. 7 is a flow diagram showing operations of SEQ# numbering program.

FIG. 8 is a flow diagram showing operations of SF creating program and JNL transfer program.

FIG. 14 is a diagram showing contents of pair information for mirroring.

FIG. 15 is a diagram showing contents of pair information for asynchronous remote copy.

FIG. 20 is a flow diagram showing operations of the numbering storage when it receives data from the non-numbering storage by synchronous remote copy at the time when the non-numbering storage receives writing.

FIG. 21 is a flow diagram showing operations of the non-numbering storage from when the non-numbering storage receives writing until when it returns acknowledgement to the host.

DETAILED DESCRIPTION OF THE PREFERRED EMBODIMENTS

Hereinafter, the preferred embodiments of the present invention will be explained in detail with reference to the attached drawings.

EXAMPLE 1

Figure 1:
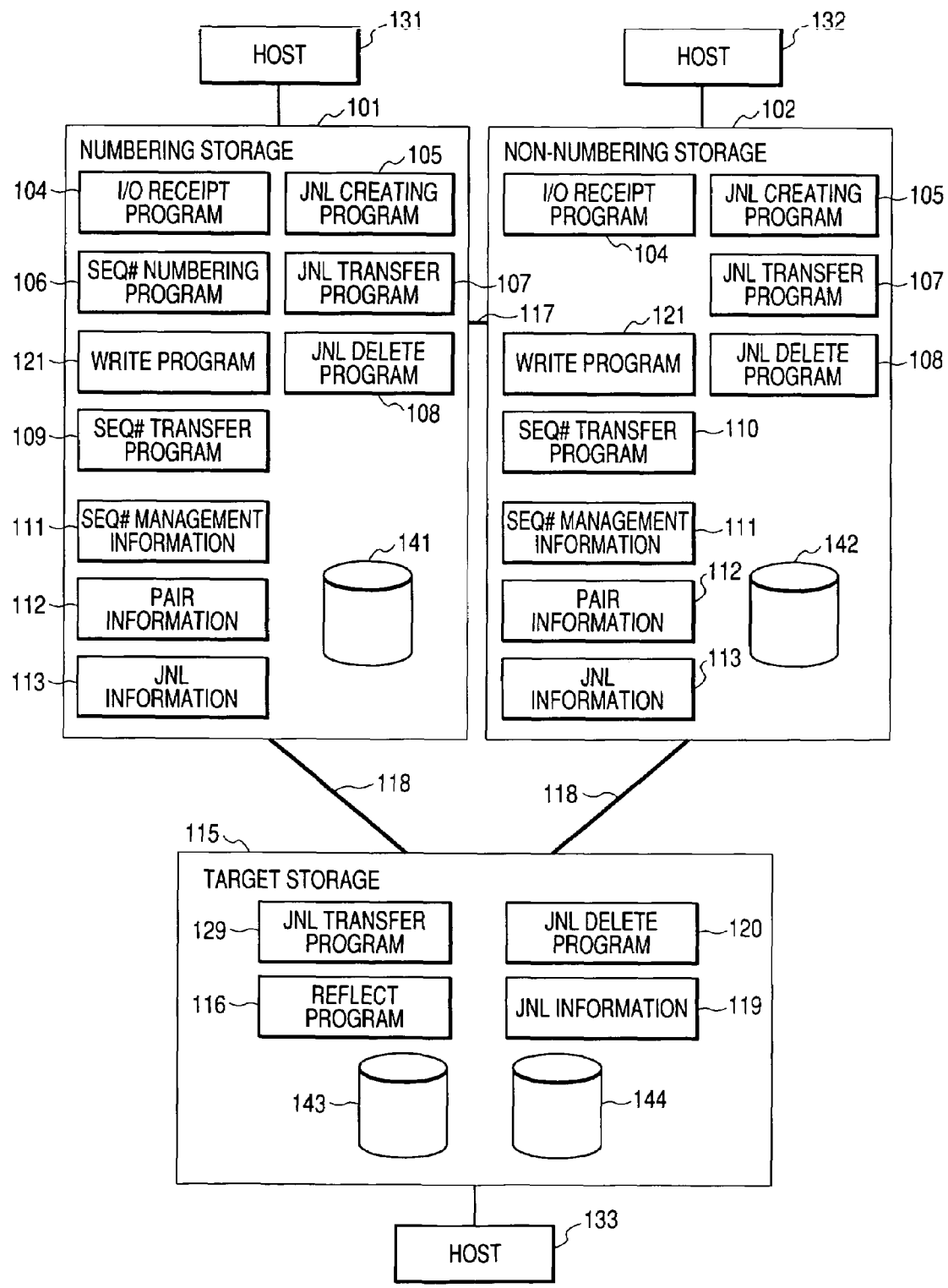
FIG. 1 is a diagram showing a configuration of hardware and each storage of the system according to the first embodiment of the present invention.
Figure 5:
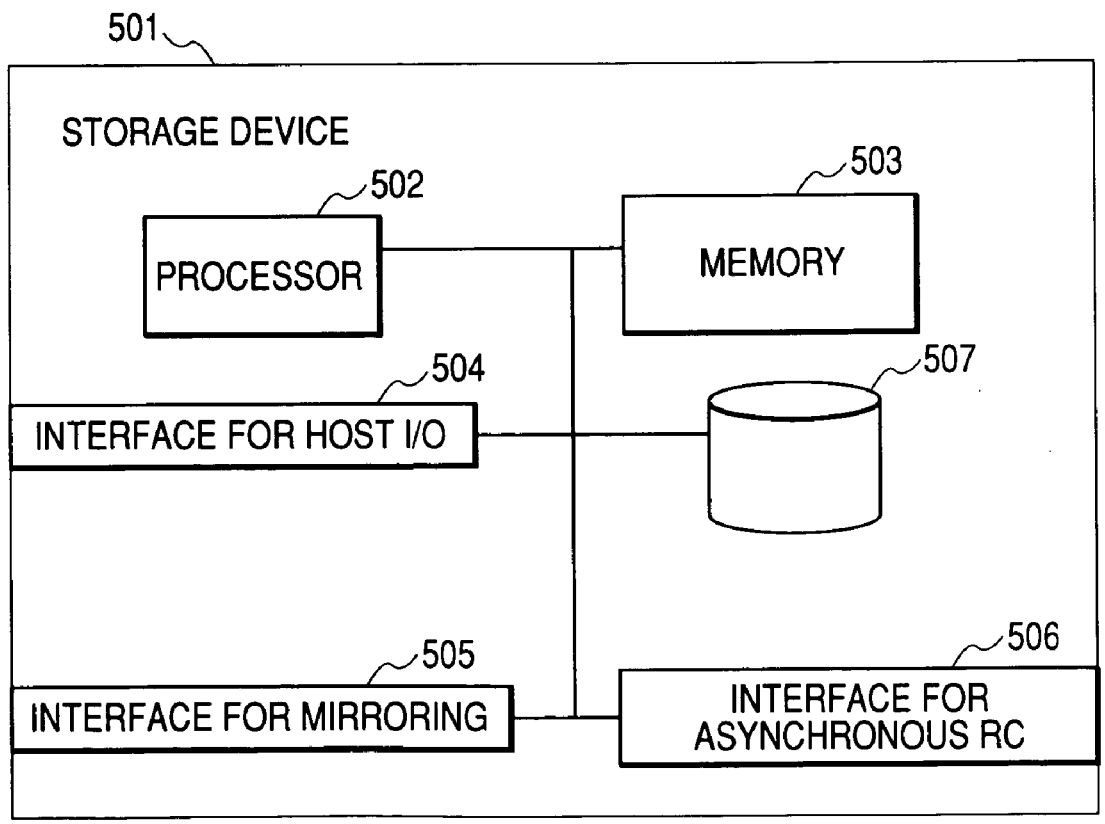
FIG. 5 is a diagram showing hardware of the storage.

FIG. 1 is a diagram showing software configuration as one embodiment of the information processing system, which utilizes the present invention. Hardware configuration as one embodiment is shown in FIG. 5. Corresponding relations between the software and the hardware configurations will be described later.

The information processing system includes storages 101, 102, 115, hosts 131, 132, 133 and networks 117 and 118. In order to simplify the following explanations, the storage 101 is referred to as "numbering storage", which gives serial number as additional information for order assurance or similar additional information (hereinafter, referred to as "SEQ#"), and the storage 102 is referred to as "non-numbering storage", which is the other source for remote copying. If the two storages are not distinguished, both are referred to as "source storage". The storage 115 at a remote location is referred to as "target storage". The terms "source" and "target" are also used for the volumes within the storage. Therefore, the volumes within the source storages are referred to as "source volumes 141, 142", and the volumes within the target storage are referred to as "target volumes 143, 144".

It is to be noted that FIG. 1 shows an example where the numbering storage 101 and the non-numbering storage 102 are separate ones, but it is also possible to configure the numbering storage 101 and the non-numbering storage 102 as one cluster configuration storage.

Hosts 131, 132, and 133 are computers in which application programs operates for executing jobs such as transaction processing. Those computers utilize volumes 141, 142, 143 and 144 respectively in the connected storages. Under normal conditions, the hosts 131, 132 connected to the source storages perform operations, and the host 133 connected to the target storage is a standby type host for taking over the operations at the time when a failure occurs in the source storages.

Volumes 141, 142 are volumes within the source storages, and the hosts 131, 132 perform writing into the volumes respectively. The volumes 143 and 144 are volumes within the target storage, and hold a copy of data of the volumes 141, 142 respectively.

Network 117 is a network which connects the numbering storage 101 and the non-numbering storage 102. By way of this network, the numbering storage 101 and the non-numbering storage 102 perform a SEQ# request and data transfer.

Network 118 is a network which carries out asynchronous remote copy from the source storages to the target storage.

I/O receipt program 104 is a program which receives write data from the hosts 131, 132.

SEQ# numbering program 106 is a program which gives SEQ# to the writings from the hosts 131, 132.

JNL creating program 105 is a program which stores the write data and a destination of logical volume as a write destination (referred to as "LUID" hereinafter) from the host that the I/O receipt program 104 has received and the SEQ# given by the SEQ# numbering program 106 are stored in the JNL information 113 as a journal (referred to as "JNL" hereinafter).

JNL transfer program 107 is a program which transfers the JNL stored in the JNL information to the JNL transfer program 129 of the target storage. The JNL transfer program 129 stores the JNL thus received in the JNL information 113 within the target storage.

JNL delete program 108 within the source storages is a program for deleting the JNL whose transfer to the target storage has been completed. Furthermore, the JNL delete program 120 within the target storage is a program for deleting the JNL whose reflecting has been completed.

Reflect program 116 is a program which refers to the JNL information within the target storage, and writes the write data from a cache to the volumes 143, 144. Hereinafter, this processing is called "reflecting".

Write program 121 is a program which writes the write data received by the I/O receipt program 104 into the volumes 141, 142.

SEQ# management information 111 is information for giving SEQ#. Explanation regarding this information will be given later with reference to FIG. 7.

Pair information 112 is information indicating a correspondence between the logical volumes within the volumes and a status of a pair thus corresponding, in the remote copying process. Explanation regarding this information will be given later with reference to FIG. 3.

JNL information 113 indicates an area for storing the JNL which is information having been obtained by adding a header for management, such as LUID and SEQ#, to the write data from the hosts 131, 132.

JNL information 119 indicates an area for storing the JNL having been transferred from the source storage to the target storage.

JNL information 113, 119 further includes a reflect flag indicating a completion of reflecting, and a send flag indicating a completion of sending. Explanation regarding this information will be given later with reference to FIG. 2.

There are two types of remote copy, synchronous and asynchronous. In this embodiment, data copy is carried out by use of the asynchronous remote copy.

For the asynchronous remote copy, a pair status is defined so as to indicate a copying status, and the processing is managed by the pair information. As the pair status, Simplex (X), Initial-Copying (IC), Duplex (D), Suspend (S), Duplex-Pending (DP), and Suspending (SI) are defined.

The pair status in a remote copy is information showing a copying status to an administrator of the remote copy. The administrator controls copying process of the remote copy, by issuing a command to instruct a transit of the pair status. Hereinafter, the pair status in the remote copy will be explained.

In Simplex status, the remote copy between volumes in the source and target has not been started yet. Initial-Copying status is an intermediate state where the remote copy is started from the Simplex status and it is in the course of transiting to the Duplex status, which will be described later. During this period, an initial copy (copying of data that has already been stored in the source volume) from the source volume to the target volume is carried out. After a completion of the initial copy, internal processing required for transiting to the Duplex status is completed, and then the pair status becomes Duplex.

In the Duplex status, the initial copy is completed and update copy is ready to be carried out. That is, in this status, when writing is received from a host, update copy of the writing will be carried out to the target volume. In a broad point of view, the data between the volumes of the source and the target are assumed to be identical. However, since the update copy is carried out asynchronously, such identity is not assured in the strict sense.

Suspend status is a status where the update copy is suspended. In this status, the identity between the volumes between the source and the target in the broad point of view cannot be assured at all. The pair status is allowed to transit to the Suspend status, triggered by an instruction from an operator, a host, a computer for managing the storages and the like.

Other than the above case, if the remote copy from the source volume to the target volume becomes impossible, the storage automatically allows the pair status to transit to the Suspend status. In the following explanations, the latter case is referred to as "Failure Suspend status". A failure in the volumes of the source and the target, a failure in the storages of the source and the target, a failure in the channel between the source and the target (in the present invention, a failure in the network 118 connecting the source storage and the target storage) may cause the Failure Suspend status. However, failures other than the above cases may cause the Failure Suspend status.

Suspending status is an intermediate state where the status is transiting from the Duplex status to the Suspend status. The Suspend status also includes the Failure Suspend status. In this status, the storages of the source and the target may carry out processing for reflecting the JNL held by the memories in both source storages to the target storage.

Duplex-Pending status is an intermediate state where the status is transiting from the Suspend status to the Duplex status. In this status, data copy is executed from the source volume to the target volume in order to match the data in the source volume to that in the target volume. After the data identity between the source and the target volumes is assured, the pair status becomes Duplex status. It is to be noted that the data copy in the Duplex-Pending status may be a differential copy, where only the part required to be updated is copied by use of the information including the update area in the Suspend status as described above. Initial-Copying status and Duplex-Pending status are collectively assumed as one status, and it may be displayed on the management device, and the status may be allowed to transit from this one status.

FIG. 2 shows contents of the JNL information 113. The JNL information includes an area for storing LUID 201, SEQ# 202, and write data 203, received from the host. The JNL information further holds information as to a reflect flag 204 indicating a completion of reflecting, and a send flag 205 indicating a completion of sending. When the reflect flag 204 is ON, it means that the JNL has been reflected to the volumes 143, 144, and when it is OFF, it means that the reflecting has not been completed. When the send flag 205 is ON, it means that acknowledgement as to the JNL has been received from the target storage 115, and when it is OFF, acknowledgement has not been received yet. Those flags are used for determining whether or not the JNL delete program 108 can delete the JNL.

FIG. 3 shows contents of the pair information 112. The pair information 112 manages data correspondence in logical volumes within the volumes. The pair information 112 holds logical volume number on the source volume side (called "source LUID") 301, and logical volume number on the target side (called "target LUID") 302. The pair information 112 further holds a pair status 303 indicating the pair status of those logical volumes (the pair status will be described later), and a differential bit map 304 indicating whether or not there is a data difference between the source LUID and the target LUID.

Figure 4:
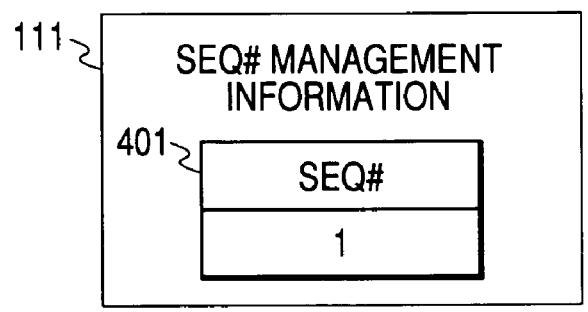
FIG. 4 is a diagram showing contents of SEQ# management information.

FIG. 4 shows contents of the SEQ# management information 111. The SEQ# stored information 111 holds the latest information 701 of SEQ# currently given.

FIG. 5 shows a storage 501, which is hardware architecture of the storages 101, 102 and 115. The storages 101, 102 and 115 respectively include processor 502, memory 503, interface for host I/O 504 which performs I/O exchange with the host, interface for mirroring 505 which performs SEQ# requesting and transferring, interface for asynchronous RC 506 for establishing a connection with a network to carry out asynchronous remote copy from the source storage to the target storage, and volumes 141, 142, 143, 144 (represented as 507 in the figure) for storing data. As already mentioned above, FIG. 5 is a diagram showing the hardware configuration corresponding to the software configuration of the storage as shown in FIG. 1 according to the present invention. These figures are correlated such that each program and each information item shown in FIG. 1 are stored in the memory 503 as shown in FIG. 5 from a viewpoint of hardware, and those are executed by the processor 502 as shown in FIG. 5.

FIG. 6 is a flow diagram showing the operations of the information processing system from when the source storages receive I/O from the hosts 131, 132 until when writing to the volumes 143, 144 of the target storage is completed.

When there is writing from the host 131 to the numbering storage 101, the following steps are executed.

I/O receipt program 104 within the numbering storage 101 receives the write data from the host 131 (Step 601).

Next, the SEQ# numbering program 106 within the numbering storage 101 gives a SEQ# to the write data (Step 602).

Then I/O receipt program 104 within the numbering storage 101 returns to the host 131 acknowledgement (Ack) as to completion of writing (Step 603).

Next, JNL creating program 105 within the source storage creates a JNL from the SEQ# and the write data (Step 604), and stores the JNL in the JNL information 113(Step 605).

JNL transfer program 107 transfers the JNL stored in the JNL information 113, to the target storage 115 by way of the network 118 (Step 606).

JNL transfer program 129 within the target storage 115 receives the JNL data, which has been sent in the step 606 (Step 607).

Processing from Step 608 to Step 610 and processing from Step 611 to Step 613 are executed in parallel.

JNL transfer program 129 within the target storage 115 stores the data into the JNL management information 113 which is also in the target storage 115 (Step 608). Next, reflect program 116 sorts the JNL in the JNL information 113 in the order of SEQ#, and reflects the JNL to the volumes 143, 144 within the target storage (Step 609).

JNL delete program 120 within the target storage deletes the JNL data, as to which data reflecting has been completed, in the JNL management information 113 (Step 610).

After the JNL transfer program 129 within the target storage receives the data, it returns acknowledgement to the source storage that has performed the data transfer (Step 611).

JNL transfer program 107 within the source storage that has received the acknowledgement sets the send flag ON as to the data in the JNL information 113 (Step 612).

JNL delete program 108 within the source storage deletes the data whose send flag 505 becomes ON (Step 613).

When there is writing from the host 132 to the non-numbering storage 102, the following steps are executed instead of the steps 601, 602.

I/O receipt program 104 within the non-numbering storage 102 receives I/O from the host 132 (Step 614).

Next, the SEQ# transfer program 110 within the non-numbering storage 102 requests a SEQ# to the numbering storage (Step 615).

SEQ# numbering program 106 within the numbering storage 101 gives the SEQ# to the write data (Step 616).

SEQ# transfer program 109 within the numbering storage 101 transfers the SEQ# to the non-numbering storage (Step 617).

I/O receipt program 104 within the non-numbering storage 102 returns a notice of write completion to the host 132 (Step 618).

In the following, steps 604 to 613 are executed.

FIG. 7 is a flow diagram showing operations of the SEQ# numbering program 106 as shown in FIG. 1.

The SEQ# numbering program receives a numbering request from the I/O receipt program 104 or the SEQ# transfer program 109 within the numbering storage (Step 701).

The SEQ# numbering program 106 obtains the latest SEQ# 701 from the SEQ# stored area 111 (Step 702).

The SEQ# is transferred to the JNL creation program 105 being a requesting source of thus received SEQ# or the SEQ# transfer program (Step 703).

SEQ# numbering program 106 adds 1 (one) to the SEQ# 701 in the SEQ# management information 111 (Step 704).

FIG. 8 is a flow diagram showing operations of the JNL creating program 105 and JNL transfer program 107 as shown in FIG. 1. The JNL creating program 105 receives data and LUID from the I/O receipt program 104 (Step 801).

The JNL creating program 105 receives a SEQ# from the SEQ# numbering program 106 or from the SEQ# transfer program 110 (Step 802).

The JNL creating program 105 writes in the JNL information the data, LUID and SEQ# thus received (Step 803).

The JNL creating program 105 returns a notice of JNL creating completion to the I/O receipt program 104. The I/O program returns acknowledgement to the host 131 or the host 132 (Step 803).

The JNL creating program 105 notifies the JNL transfer program 107 of the JNL creating completion (Step 804).

JNL transfer program 107 confirms the JNL management information 113 (step 805).

The JNL transfer program 107 transfers the JNL to the JNL transfer program 129 within the target storage via the network 118 (Step 806).

The JNL transfer program 107 waits for the acknowledgement from the target storage, and after it receives the acknowledgement, the JNL transfer program 107 sets the send flag ON in the JNL information (Step 807).

Figure 9:
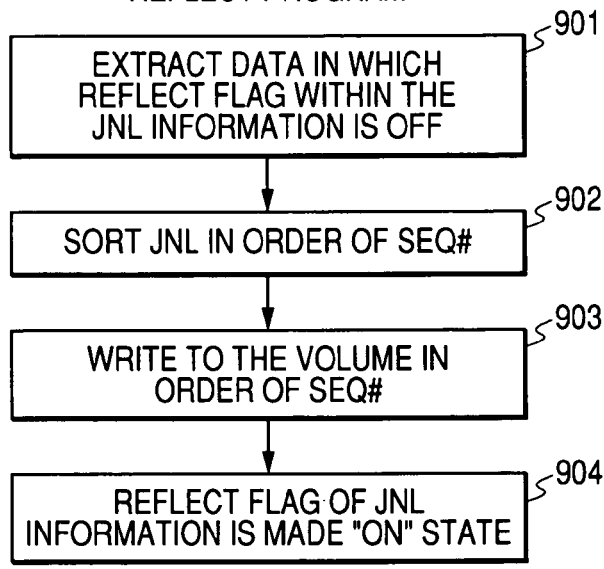
FIG. 9 is a flow diagram showing operations of reflect program.

FIG. 9 is a flow diagram showing operations of the reflect program 116 within the target storage as shown FIG. 1. The reflect program 116 refers to the JNL in the JNL information 113, and extracts the JNL whose reflect flag is OFF (Step 901).

The reflect program 116 sorts thus extracted JNL data in the order of SEQ# (Step 902).

The reflect program 116 writes the JNL data into the volume 114 in the order of SEQ#. At this timing, if there is a skip in the SEQ#, writing is made immediately before the skipped number (Step 903).

The reflect program 116 sets the reflect flag 504 ON for the JNL data as to which writing has been completed (Step 904).

Figure 10:
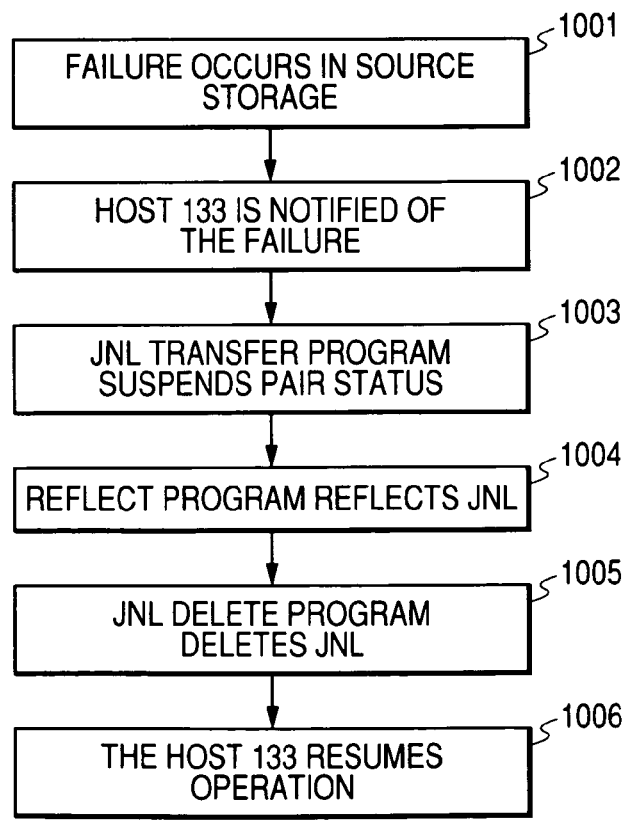
FIG. 10 is a flow diagram showing procedures of failure recovery when a failure occurs in one of the source storages.

FIG. 10 shows a recovery procedure in the case where a failure occurs in the source storage. The recovery mentioned here indicates that the host 133 takes over the operations of the applications, which have been carried out in the hosts 131, 132, by use of the data in the target storage 115.

A failure occurs in the source storage, and then, the host 131 or the host 132 detects the failure. Alternatively, the hosts allow the storage to detect the failure (Step 1001).

The hosts 131, 132 notify the host 133 of failure occurrence (Step 1002).

The host 133 notifies the JNL transfer program in the target storage of the failure occurrence. Then, the JNL transfer program renders the connection with the source storage as suspend status. The JNL transfer program changes the pair status in the pair information as "Suspend" (Step 1003).

The reflect program sorts the JNL in the JNL information 113 in the order of SEQ#, and writes the JNL into the volumes 143, 144 within the target storage (Step 1004).

The JNL delete program deletes all the JNLs in the JNL information (Step 1005).

The host 133 resumes the operations (Step 1006).

EXAMPLE 2

In the second embodiment, the source storages perform data mirroring each other by use of synchronous remote copy. Then, the second embodiment takes a form that the data is transferred to the target storage by asynchronous remote copy.

Figure 11:
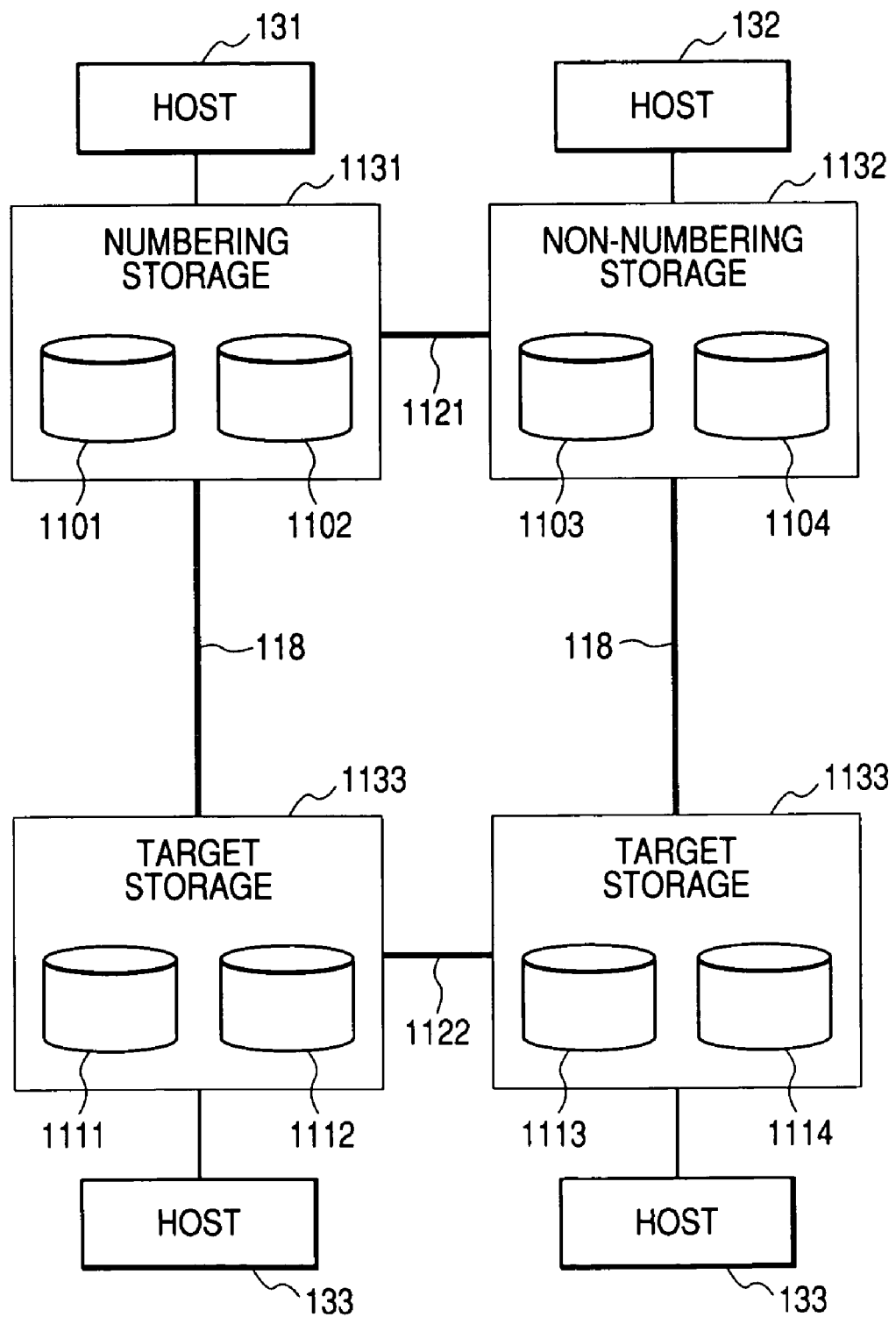
FIG. 11 is a diagram showing a hardware configuration regarding the second embodiment of the present invention.

FIG. 11 is a diagram showing the second embodiment.

The information processing system includes numbering storage 1131, non-numbering storage 1132, two target storages 1133, hosts 131, 132, 133, and networks 118, 1121, 1122.

The volume 1101 is a volume in the numbering storage 131 to store the writing from the host 1132. The volume 1103 is a mirror volume in the non-numbering storage 1132, corresponding to the volume 1101. The volume 1104 is a volume in the non-numbering storage 1132 to store the writing from the host 132. The volume 1102 is a mirror volume in the numbering storage 101, corresponding to the volume 1104.

The network 1121 is a network for connecting the source storages each other. Through this network, the write data, SEQ# and acknowledgement are transferred via synchronous remote copy.

The network 1122 is a network for connecting the target storages each other. Through this network, the write data and acknowledgement are transferred via synchronous remote copy.

It is to be noted that in the embodiments of the present invention, a plurality of storages in the source site and a plurality of storages in the target site may cause a similar effect, in any case where they are multiple storages in each site, or they constitute a cluster configuration storages formed in one body in each site.

Figure 12:
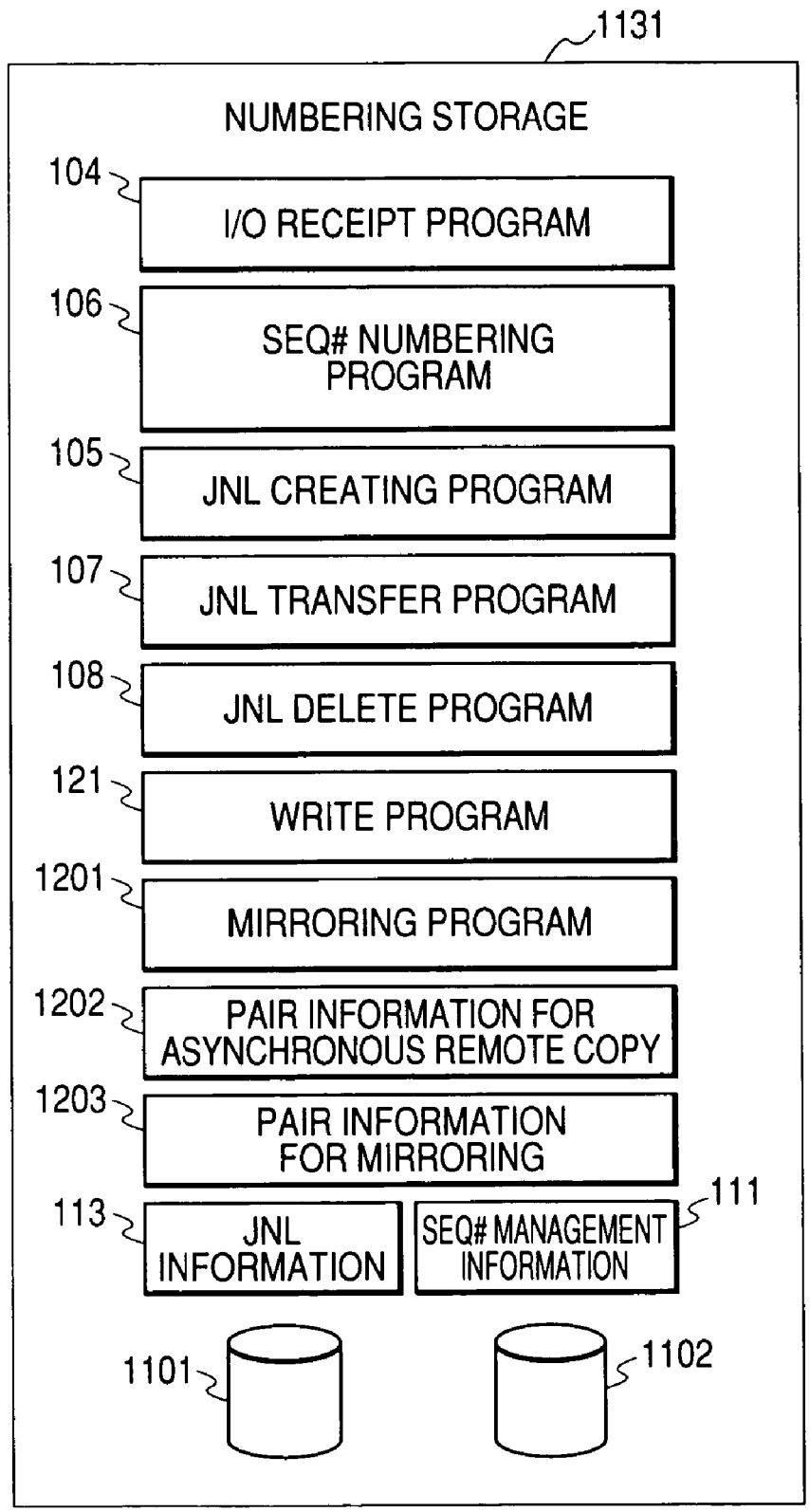
FIG. 12 is a diagram showing a structure of numbering storage.

FIG. 12 is a diagram showing programs and the internal information of the numbering storage 1131. The non-numbering storage has the same configuration.

The mirroring program 1201 is a program for carrying out synchronous remote copy between the source storages, and between the target storages.

The pair information for asynchronous remote copy 1202 is pair information in the asynchronous remote copy between the source and the target, and it is allowed to have functions equivalent to those of the pair information 112 in the first embodiment.

The pair information for mirroring 1203 is pair information regarding mirroring between the source storages and between the target storages.

The non-numbering storage 1132 also has the same configuration as that of the numbering storage 1131.

Figure 13:
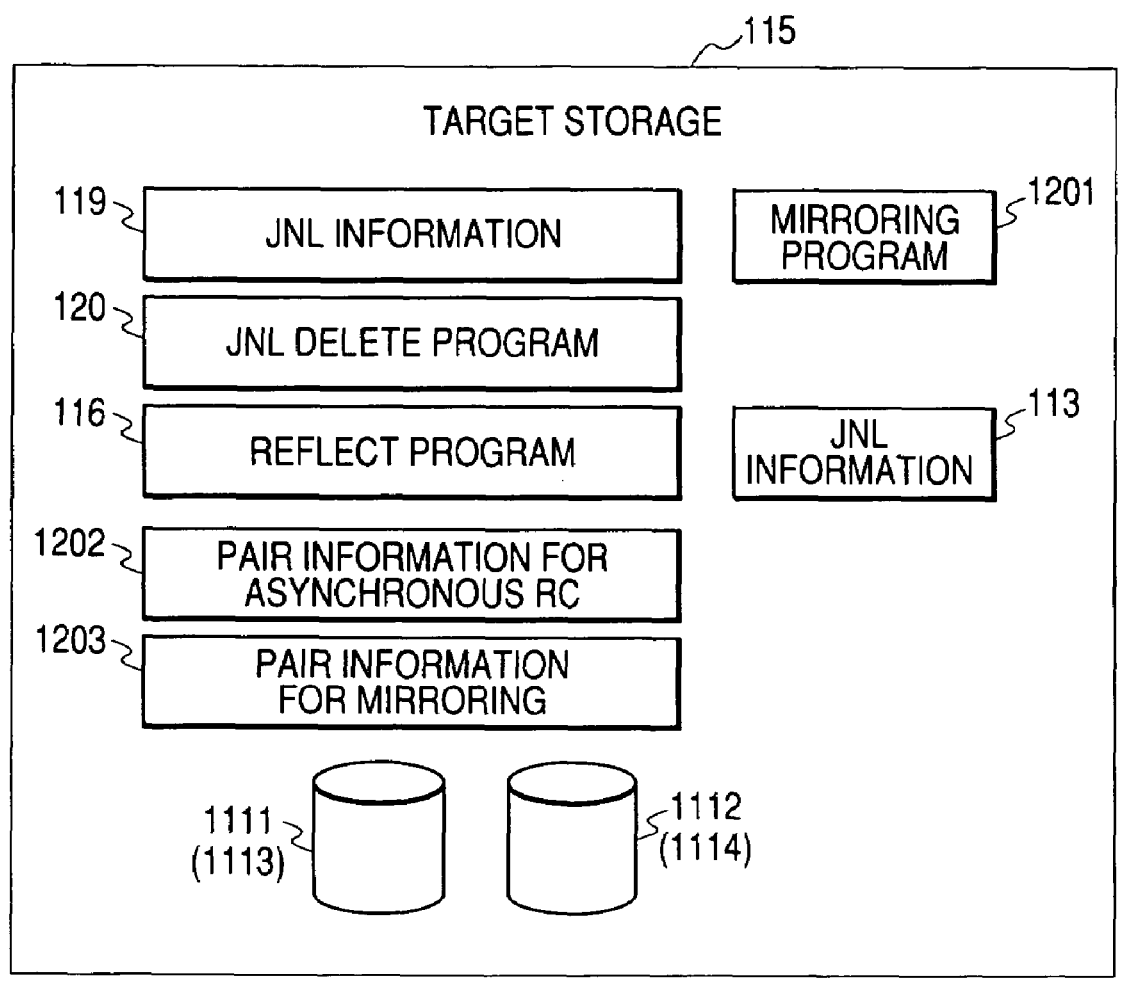
FIG. 13 is a diagram showing a structure of target storage.

FIG. 13 is a diagram showing programs and the internal information of the target storage in the second embodiment. It includes, as points different from the first embodiment, mirroring program 1201, pair information for asynchronous remote copy 1202, and pair information for mirroring 1203.

FIG. 14 is a diagram showing contents of the pair information for mirroring 1203. Pair status 1403 shows a network connection state with respect to each LUID pair (a combination of source LUID and target ID).

FIG. 15 is a diagram showing the pair information for asynchronous remote copy 1202.

Figure 16:
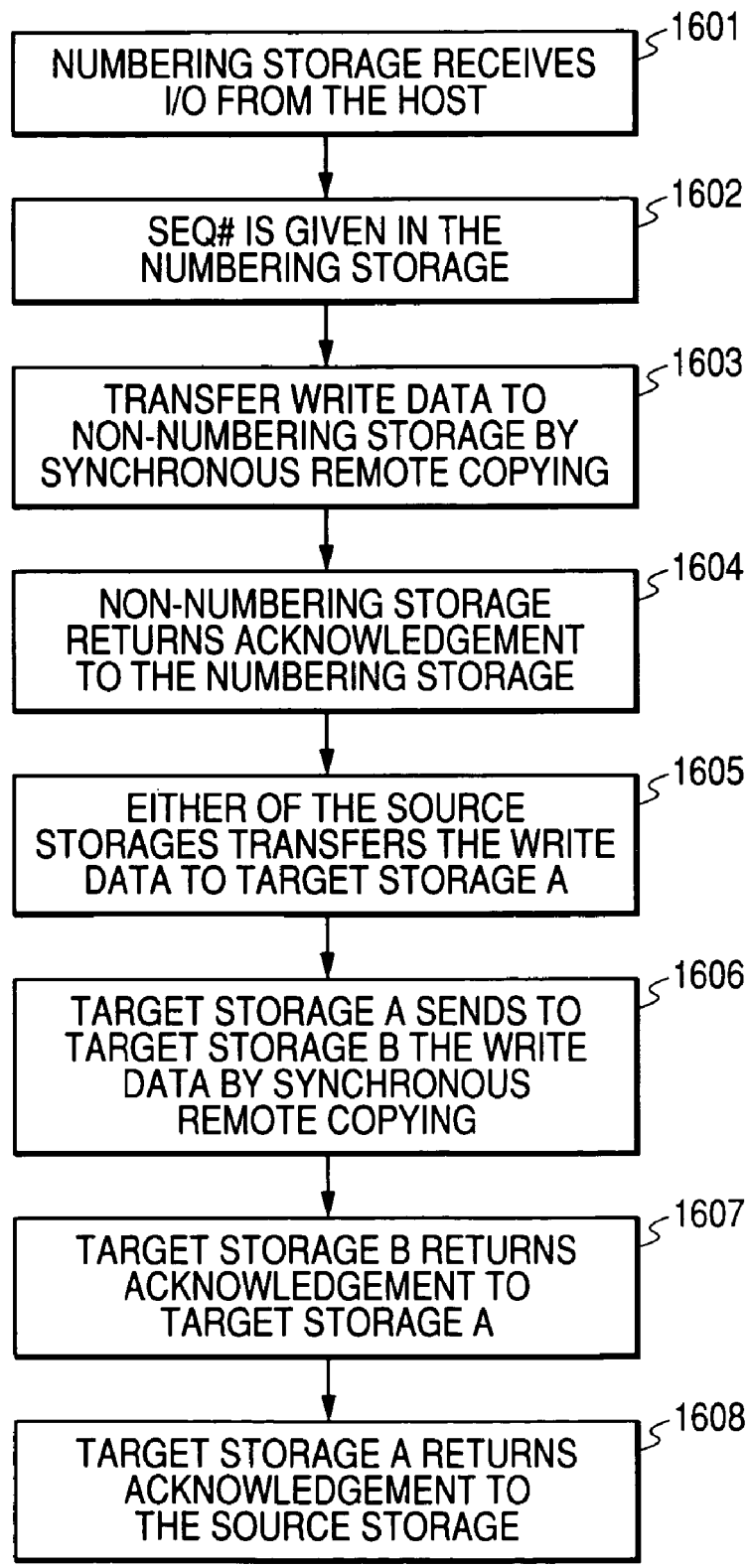
FIG. 16 is a flow diagram showing operations in the second embodiment from when the numbering storage receives writing from the host, then transfers the writing to the target storage, until when the numbering storage receives acknowledgement.

FIG. 16 is a flow diagram showing from when the numbering storage 1131 receives I/O from the host 131 until when the writing is reflected to the target storage for the entire system.

In the present embodiment, one of the source storages transfers data by asynchronous remote copy, and a target storage which receives the data is referred to as "target storage A", and the other target storage is referred to as "target storage B". At this timing, the target storage A and the target storage B are determined based on which source storage transfers the data. Furthermore, it is allowed to arbitrary determine which source storage carries out the data transfer.

The numbering storage 1131 receives the write data from the host 131 (Step 1601).

The numbering storage 1131 gives a SEQ# to the write data (Step 1602).

The numbering storage 1131 transfers the write data to the non-numbering storage 1132 by synchronous remote copy (Step 1603).

The non-numbering storage 1132 returns acknowledgement to the numbering storage 1131 (Step 1604).

One of the source storages transfers the write data to the target storage A by asynchronous remote copy (Step 1605).

The target storage A transfers the write data to the target storage B by synchronous remote copy (Step 1606).

The target storage B returns acknowledgement to the target storage A (Step 1607).

The target storage A sends acknowledgement to the source storage which has carried out the data transfer (Step 1608).

Figure 17:
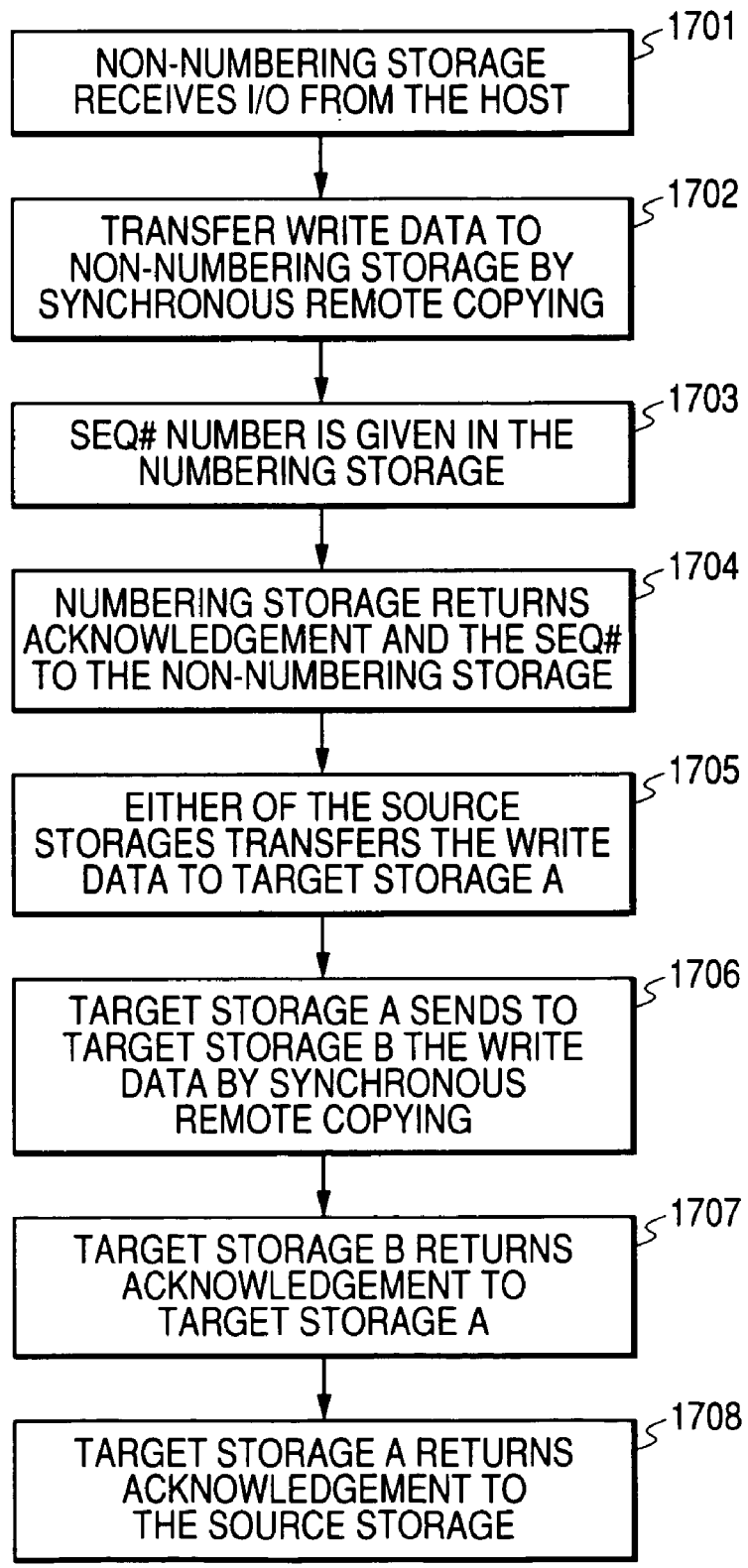
FIG. 17 is a flow diagram showing operations in the second embodiment from when the non-numbering storage receives writing from the host, then transfers the writing to the target storage, until when the numbering storage receives acknowledgement.

FIG. 17 is a flow diagram showing that the non-numbering storage 1132 receives I/O from the host 132, transfers the data by synchronous remote copy to the numbering storage 1131 via the network 1121, either one of the source storages transfers the data to the target storage A by asynchronous remote copy via the network 118, and the target storage A transfers the data to the target storage B by synchronous remote copy.

The non-numbering storage 1132 receives write data from the host 132 (Step 1701).

The numbering storage 1132 transfers the write data to the numbering storage 1131 by synchronous remote copy (Step 1702).

The numbering storage 1131 gives a SEQ# to the write data (Step 1703).

The numbering storage 1131 returns acknowledgement and the SEQ# to the non-numbering storage 1132 (Step 1704).

One of the source storages transfers the write data to the target storage A by asynchronous remote copy (Step 1705).

The target storage A transfers the write data to the target storage B by synchronous remote copy (Step 1706).

The target storage B returns acknowledgement to the target storage A (Step 1707).

The target storage A sends acknowledgement to the source storage which has carried out data transfer (Step 1708).

Figure 18:
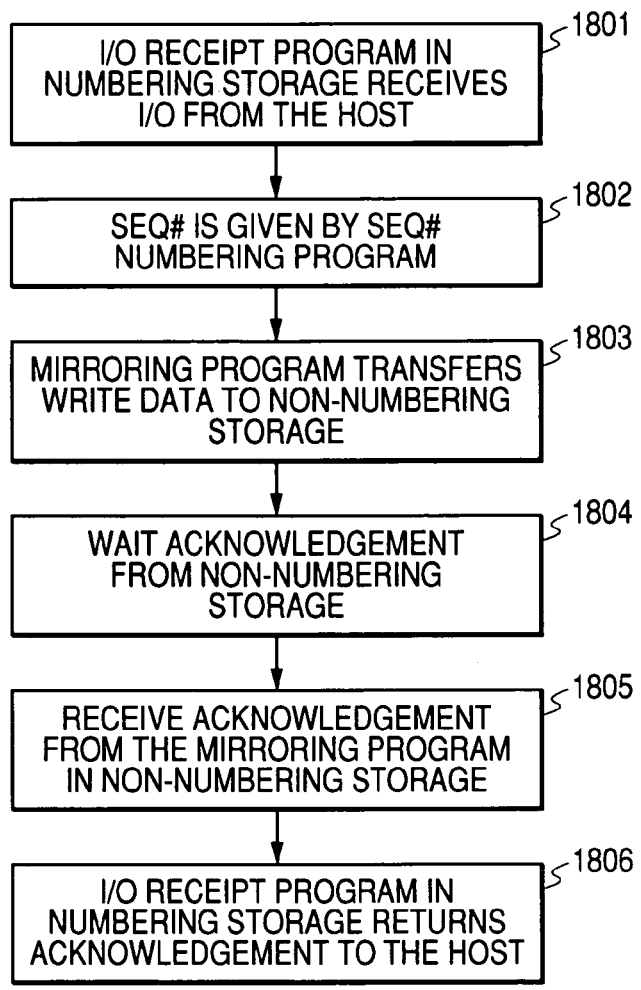
FIG. 18 is a flow diagram showing operations of the numbering storage from when the numbering storage receives writing until it returns acknowledgement to the host.

FIG. 18 is a flow diagram showing operations in the numbering storage at the time when the numbering storage 1131 receives I/O.

I/O receipt program 104 within the numbering storage 1131 receives write data from the host 131 (Step 1801).

SEQ# numbering program 106 within the numbering storage 1131 gives a SEQ# to the write data (Step 1802).

Mirroring program 1201 within the numbering storage 1131 transfers the write data to the non-numbering storage 1132 (Step 1803).

The numbering storage 1131 waits for acknowledgement from the non-numbering storage 1132 (Step 1804).

Mirroring program 1201 within the numbering storage 1131 receives acknowledgement from the mirroring program 1201 within the non-numbering storage 1132 (Step 1805).

The I/O receipt program 104 within the numbering storage 1131 returns acknowledgement to the host 131 (step 1806).

Figure 22:
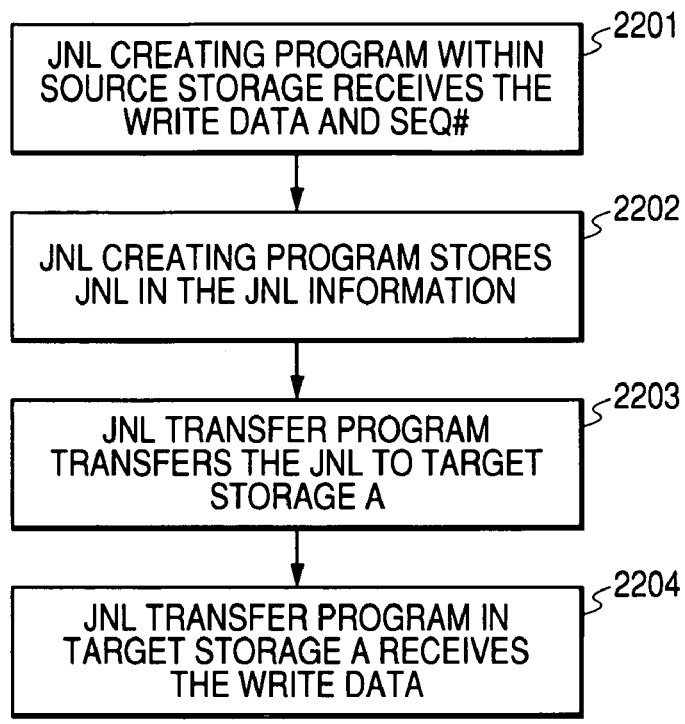
FIG. 22 is a flow diagram showing operations of the source storage to transfer a JNL to the target storage.

FIG. 22 is a flow diagram showing that the numbering storage 1131 creates a JNL when it carries out the JNL transfer, and then transfers the JNL to the target storage.

JNL creating program 105 within the numbering storage 1131 receives the write data and the SEQ# from the I/O receipt program 104 or the mirroring program 1201, and receives the SEQ# from the SEQ# numbering program (Step 2201).

The JNL creating program 105 writes the write data, LUID and SEQ# into the JNL information 113 (Step 2202).

JNL transfer program 107 confirms the JNL information 113, and transfers the JNL to the target storage A (Step 2203).

JNL transfer program 129 of the target storage A receives the JNL from the numbering storage (Step 2204).

At this timing, if the numbering storage does not carry out the JNL transfer, the process is completed at the Step 2202.

Figure 25:
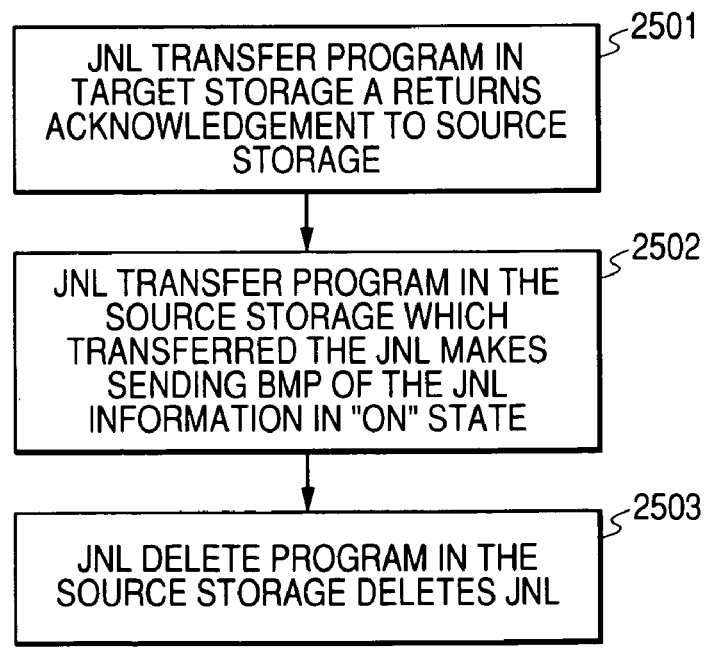
FIG. 25 is a flow diagram showing operations from when the target storage A returns acknowledgement to the source storage.

FIG. 25 is a flow diagram showing that after the numbering storage 1131 carries out JNL transfer, the target storage A receives the JNL, returns acknowledgement to the numbering storage 1131, and then the numbering storage 1131 deletes the JNL.

JNL transfer program 129 within the target storage A returns acknowledgement to the JNL transfer program 107 within the numbering storage 1131 (Step 2501).

The JNL transfer program 107 of the source storage which has transferred the JNL sets the send flag 205 of the JNL information ON (Step 2502).

JNL delete program 108 within the source storage confirms the send flag as to the JNL in the JNL information, and deletes the JNL whose send flag is ON (Step 2503).

Figure 19:
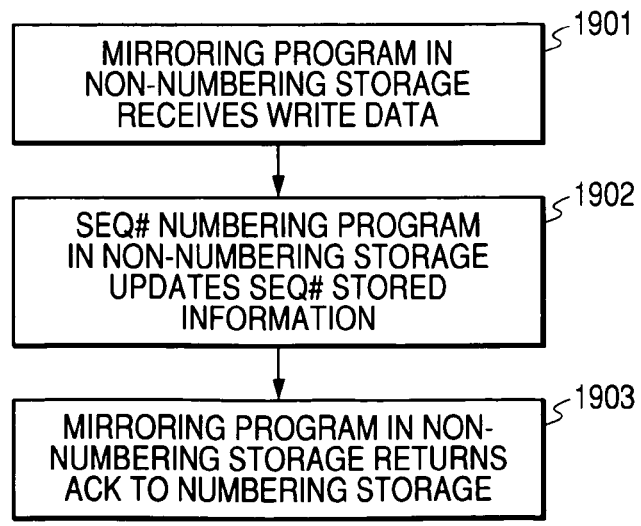
FIG. 19 is a flow diagram showing operations of the non-numbering storage when it receives data from the numbering storage by synchronous remote copy at the time when the numbering storage receives writing.

FIG. 19 is a flow diagram showing operations of the non-numbering storage 1132 from when the numbering storage 1131 receives I/O from the host 131 and transfers the write data to the non-numbering storage 1132 by synchronous remote copy.

Mirroring program 1201 in the non-numbering storage 1132 receives the write data from the numbering storage 1131 (Step 1901).

SEQ# numbering program in the non-numbering storage 1132 confirms the SEQ# given to the write data, and updates SEQ# stored information (Step 1902).

Mirroring program 1201 in the non-numbering storage 1132 returns acknowledgement to the mirroring program 1201 of the numbering storage 1131 (Step 1903).

When the non-numbering storage 1132 carries out the JNL transfer, a flow of the operations is the same as those in FIG. 22 and FIG. 25.

Figure 23:
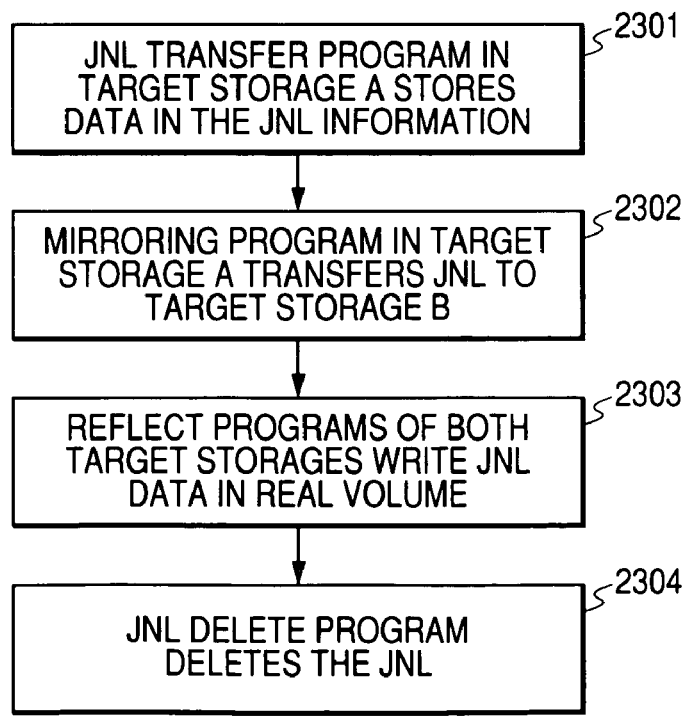
FIG. 23 is a flow diagram showing operations of the target storage A, from when it receives the JNL from the source storage, and then reflects the JNL to the real volume, until when it deletes the JNL.

FIG. 23 is a flow diagram showing from when the target storage A receives the JNL until when it reflects the JNL.

JNL transfer program 129 in the target storage A writes the JNL into the JNL information 113 (Step 2301).

Mirroring program 1201 in the target storage A transfers the JNL to the mirroring program 1201 in the target storage B (Step 2302).

Reflect program 116 in the target storage A performs reflecting of the JNL. The operation of reflecting is the same as that of FIG. 9 (Step 2303).

JNL delete program 120 in the target storage A deletes the JNL as to which writing is completed (Step 2304).

Figure 24:
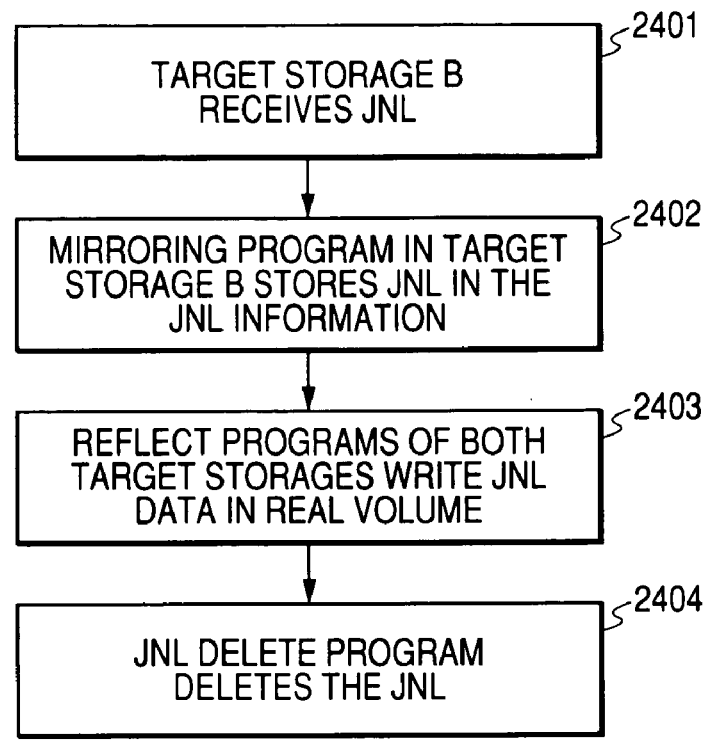
FIG. 24 is a flow diagram showing operations of the target storage B, from when it receives the JNL from the target storage A, then reflects the JNL to the real volume, until when it deletes the JNL.

FIG. 24 is a flow diagram from when the target storage B receives the JNL until it performs reflecting.

The mirroring program 1201 in the target storage B receives the JNL from the mirroring program in the target storage A (Step 2401).

The JNL transfer program 129 in the target storage B writes the JNL in the JNL information 113 (Step 2402).

The reflect program 116 in the target storage B performs reflecting of the JNL. The operation of reflecting is the same as that of FIG. 9 (Step 2403).

The JNL delete program 120 in the target storage B deletes the JNL as to which writing is completed (Step 2404).

FIG. 20 is a flow diagram showing operations of the numbering storage 1131 after the non-numbering storage 1132 receives I/O from the host 132 and transfers the write data to the numbering storage 1131 by synchronous remote copy.

Mirroring program 1201 in the numbering storage 1131 receives write data from the numbering storage 1132 (Step 2001).

SEQ# numbering program 106 in the numbering storage 1131 gives a SEQ# to the write data. The procedure for giving the SEQ# is the same as that of FIG. 7 (Step 2002).

The mirroring program 1201 in the numbering storage 1131 gives SEQ# to the acknowledgement and returns the acknowledgement with SEQ# to the non-numbering storage 1132 (Step 2003).

FIG. 21 is a flow diagram showing operations in the non-numbering storage 1132 when the non-numbering storage 1132 receives the I/O.

I/O receipt program 104 in the non-numbering storage 1132 receives write data from the host 132 (Step 2101).

Mirroring program 1201 in the non-numbering storage 1132 transfers write data to the numbering storage 1131 (Step 2102).

The mirroring program 1201 in the non-numbering storage 1132 receives acknowledgement and SEQ# from the mirroring program 1201 of the numbering storage 1131 (Step 2104).

SEQ# numbering program in the non-numbering storage 1132 confirms the SEQ# given to the write data, and updates the SEQ# stored information (Step 2105).

The I/O receipt program 104 in the non-numbering storage 1132 returns acknowledgement to the host 132 (Step 2106).

Operations of the target storages A and B are the same as the case where the numbering storage 1131 receives the I/O.

Figure 26:
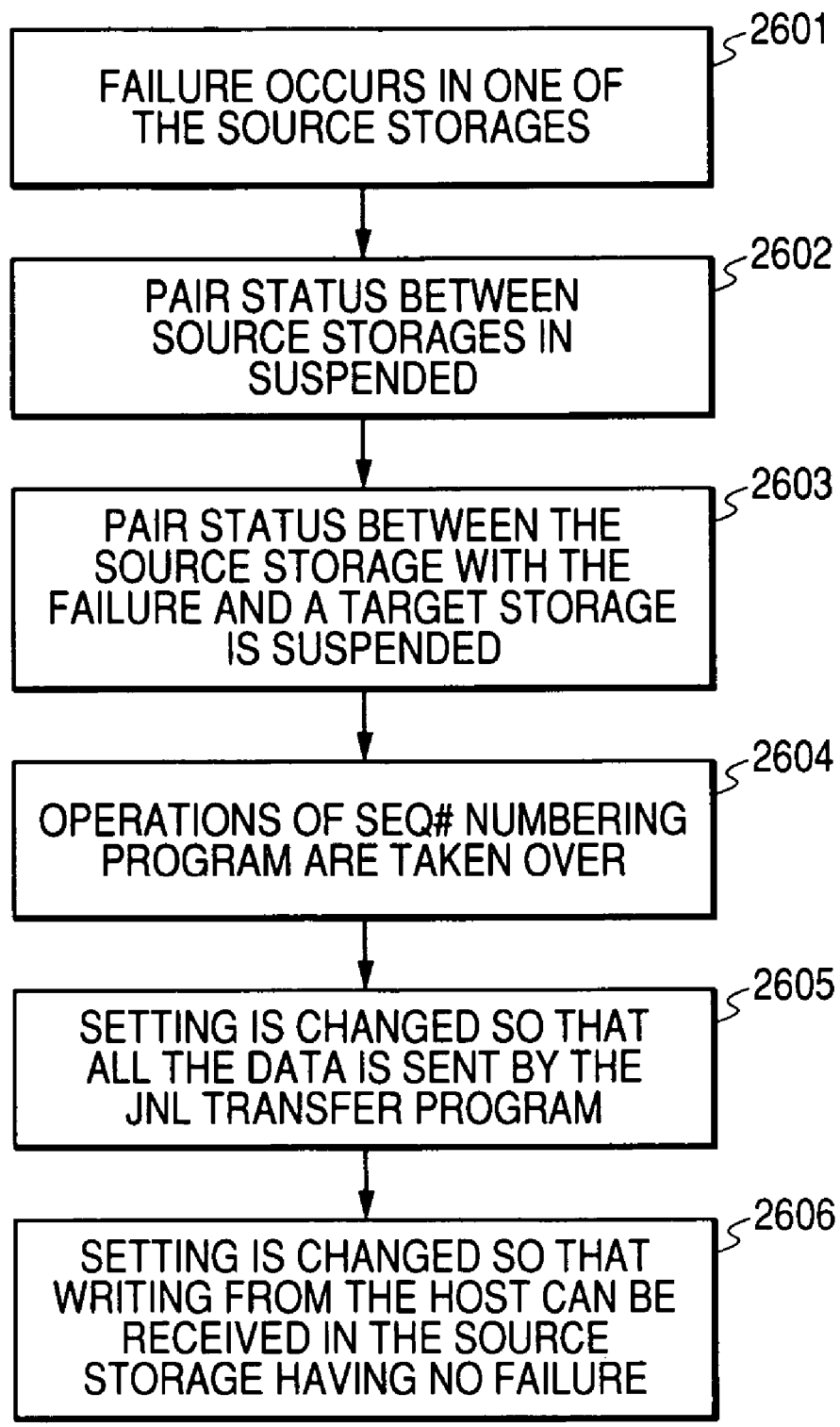
FIG. 26 is a flow diagram showing a procedure of failure recovery when a failure occurs in one of the source storages.

FIG. 26 is a flow diagram showing that when a failure occurs in one of the source storages, data transfer mode to the target storage is changed, so that a storage without the failure can receive I/O from the both hosts, and then operations can be taken over. At this timing, if there is a failure in the numbering storage, the SEQ# numbering operation is also taken over.

A failure is detected in one of the source storages (Step 2601).

Pair status between the source storages is made "Suspend" (Step 2602).

Pair status between the source storage where the failure has occurred and the target storage is made "Suspend" (Step 2603).

If the source storage in which the failure has occurred is the numbering storage 1131, the SEQ# numbering program in the non-numbering storage 1132 takes over the numbering operations based on the current SEQ# stored information 111 (Step 2604).

JNL transfer program 107 in the source storage, where the failure has not occurred (which will be referred to as "living source storage"), changes the configuration so that all the write data is transferred to the target storage (Step 2605).

The hosts 131, 132 reconfigure a connection path to the living source storage, allowing the living source storage to receive all the writing, and then operations are resumed (Step 2606).

Figure 27:
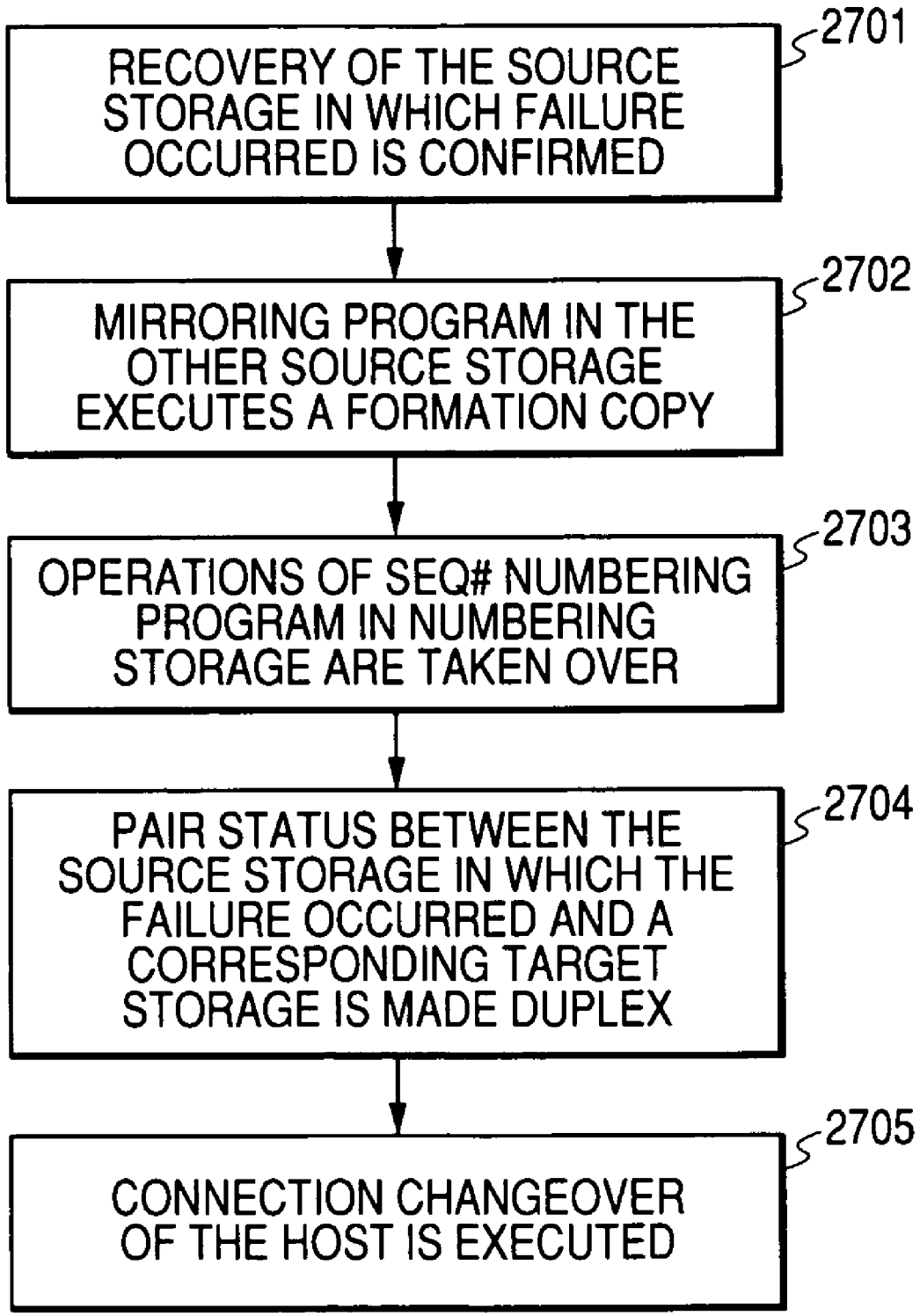
FIG. 27 is a flow diagram showing a procedure after the source storage in which the failure occurred is recovered until a normal operation is resumed.

FIG. 27 is a flow diagram showing from when a failure occurs and operations are taken over as described in FIG. 26, then, the source storage where the failure occurred is recovered, and re-switching of operations is carried out.

Recovery is confirmed in the source storage where the failure has occurred (Step 2701).

The mirroring program 1201 of the living source storage carries out formation copy of the entire data to the source storage where a failure occurred, and then the pair status is made "Duplex". If a differential copy is possible, it may be performed (Step 2702).

If required, the SEQ# numbering program 106 in the source storage where the failure has occurred obtains the SEQ# stored information 111, and allows the SEQ# numbering operations to be taken over from the living source storage (Step 2703).

The pair status between the volume of the source storage where a failure has occurred and the volume of corresponding target storage is made "Duplex" (Step 2704).

Connection paths of the hosts 131, 132 are reconfigured, so that the previously connected host can be reconnected to the source storage where the failure has occurred (Step 2705). At this timing, any type of connection mode is available. For example, all the hosts may be allowed to connect to the source storage where the failure has occurred. That is, no changeover is performed, for instance.

What is claimed is:

1. A remote copying method between a first site and a second site, said first site comprising a first storage system coupled to a first computer and a second storage system coupled to a second computer, and said second site comprising a third storage system and a fourth storage system, said method comprising the following steps:

said first storage system adds first order assurance information to first write data received from said first computer, and sends said first write data with said first order assurance information to said third storage system;

said second storage system receives second write data from said second computer;

said second storage system obtains second order assurance information from said first storage system, adds said second order assurance information to said second write data received from said second computer, and sends said second write data with said second order assurance information to said third storage system;

said third storage system writes into a storage area said first write data received from said first storage system and said second write data received from said second storage system in an order based on the first and second order assurance information given to said first and second write data, respectively; and said second storage system holds said first write data received from said first storage system; in the case where a failure occurs in said first storage system, said second storage system sends the first and second write data with the respective first and second order assurance information to said third storage system, said third storage system transfers the first and second write data with the respective first and second order assurance information received from said second storage system to said fourth storage system, and said third storage system and said fourth storage system write into respective storage areas held by said third storage system and said fourth storage system the first and second write data according to the write order based on the first and second order assurance information.

2. A remote copying method between a first site and a second site, said first site comprising a first storage system coupled to a first computer and a second storage system coupled to a second computer, and said second site comprising a third storage system and a fourth storage system, said method comprising the following steps:

said first storage system adds first order assurance information to first write data received from the first computer, and sends to said second storage system the first write data with the added first order assurance information;

one of said first storage system and said second storage system sends said first write data with the first order assurance information to said third storage system;

said second storage system sends second write data received from said second computer to said first storage system; said first storage system adds second order assurance information to said second write data received from said second storage system, and sends to said second storage system a writing completion response and said second order assurance information added to said second write data;

one of said first storage system and said second storage system sends to said third storage system said second write data with said second order assurance information;

said third storage system sends to said fourth storage system said first write data and said second write data to which the first and second order assurance information has been added, respectively;

said third storage system and said fourth storage system write said first write data and said second write data into storage areas respectively held in the third and fourth storage systems, according to a write order based on the first and second order assurance information, and said second storage system holds said first write data received from said first storage system; in the case where a failure occurs in said first storage system, said second storage system receives the first write data from said first computer and the second write data from said second computer, gives the first and second order assurance information to the first and second write data thus received. respectively, and sends the first and second write data with the respective first and second order assurance information to said third storage system, said third storage system transfers the first and second write data with the respective first and second order assurance information received from said second storage system to said fourth storage system, and said third storage system and said fourth storage system write into respective storage areas held by said third storage system and said fourth storage system the first and second write data according to the write order based on the first and second order assurance information.

3. A system for performing asynchronous remote copying from a first site to a second site comprising:

a plurality of first storage systems in said first site; and
a second storage system in said second site; wherein,
each of said plurality of first storage system comprises:
a transfer section which sends to said second storage system write data given sequence numbers for order assurance, wherein,
one of said plurality of first storage system comprises
a sequence numbering section which gives a first sequence number for order assurance to first write data that has been received, and
a sequence number transfer section which sends to another first storage system a second sequence number for order assurance given by said sequence numbering section to second write data received from said another first storage system, wherein,
said sequence numbering section gives sequence numbers for order assurance in a receiving order, to the first write data received from a computer and the second write data received from said another first storage system,
said sequence number transfer section transfers to said another first storage system the second sequence number for order assurance which has been given by said sequence numbering section to the second write data received from said another first storage system,
a transfer section of each of said plurality of first storage systems sends to said second storage system write data to which a sequence number for order assurance is given, and
said second storage system stores the write data thus received in a storage area held by said second storage system based on the sequence number for order assurance given to the write data,
wherein each of said plurality of first storage systems further comprises a transfer copy section which transfers write data received from the computer to another first storage system.
in the case where a first storage system that does not include a sequence numbering section receives write data from a computer,
said first storage system sends to said one of said plurality of first storage systems the write data thus received,
said sequence numbering system of said one of said plurallty of first storage systems gives a sequence number for order assurance to the write data received from said first storage system,
said sequence number transfer section of said one of said plurality of first storage systems sends to said first storage system the sequence number for order assurance which is given to the write data, and
said first storage system sends to said second storage system the write data together with the sequence number for order assurance received from said sequence number transfer section.

4. A system according to claim 3, wherein, when said one of said plurality of first storage systems receives write data from the computer,
said sequence numbering section gives a sequence number for order assurance to the write data,
said transfer section of said one of said plurality of first storage systems sends to said second storage system the write data to which the sequence number for order assurance is given, and
said transfer copy section of said one of said plurality of first storage systems sends to another first storage system the write data to which the sequence number for order assurance is given.

5. A system for performing asynchronous remote copying from a first site to a second site comprising:

a first storage system connected to a first computer in said first site;
a second storage system connected to a second computer in said first site;
a third storage system connected to a third computer in said second site; and
a fourth storage system connected to a fourth computer in said second site; wherein,
when said first storage system receives first write data from said first computer, said first storage system adds to the first write data first order assurance information, and sends the first write data with the first order assurance information to said second storage system, and after sending a completion notice to said first computer, said first storage system sends the first write data with the first order assurance information to said third storage system,
when said second storage system receives second write data from said second computer, said second storage system sends said second write data to said first storage system, said first storage system adds second order assurance information to the second write data received from said second storage system, and after sending the second order assurance information and a completion notice to said second storage system, said second storage system sends the second write data with the second order assurance information to said third storage system,
said third storage system sends to said fourth storage system, said first write data and said second write data,
each of said third storage system and said fourth storage system writes into respective storage areas, said first write data and said second write data in a write order based on the first and second order assurance information, and
said second storage system holds said first write data received from said first storage system; in the case where a failure occurs in said first storage system, said second storage system sends the first and second write data with the respective first and second order assurance information to said third storage system, said third storage system transfers the first and second write data with the respective first and second order assurance information received from said second storage system to said fourth storage system, and said third storage system and said fourth storage system write into respective storage areas held by said third storage system and said fourth storage system the first and second write data according to the write order based on the first and second order assurance information.

6. A system for performing a remote copy between a first site and a second site, comprising:

a numbering storage in said first site, which gives sequence numbers to received write data;

a non-numbering storage in said first site, coupled to said numbering storage; and a target storage in said second site, which is coupled to said numbering storage and said non-numbering storage; wherein, said numbering storage comprises:

an I/O receipt section, including a first I/O interface which receives the write data;

a sequence numbering section which gives sequence numbers to the write data thus received;

a sequence number transfer section which transfers sequence numbers to said non-numbering storage;

a journal creating section which creates a journal including the write data received by said I/O receipt section, write destination information, and the sequence numbers given by said numbering section;

a journal information section including a first memory area which stores the journal;

a journal transfer section which transfers the journal to the journal transfer section of said target storage;

a journal delete section which deletes the journal as to which transferring to the target storage is completed;

a real volume coupled to the first I/O interface, into which the write data received by the I/O interface is written; and a pair information section including a second memory area which holds information indicating a correspondence between logical volumes in remote copying;

said non-numbering storage comprises:

an I/O receipt section. including a second I/O interface which receives write data;

a sequence number receiving section which receives from said numbering storage the sequence numbers given to the write data;

a journal creating section which creates a journal including the write data received by said second I/O interface, write destination information, and the sequence numbers received by said sequence number receiving section;

a journal information section including a third memory area which stores the journal;

a journal transfer section which transfers the journal thus stored to the journal transfer section of said target storage;

a journal delete section which deletes the journal as to which transferring to the target storage is completed;

a real volume into which the write data received by the second I/O interface is written; and a pair information section including a fourth memory area which holds information indicating a correspondence between logical volumes in remote copying; and said target storage comprises: a real volume which stores data;

a journal transfer section which receives the journal transferred from the first site;

a journal information section which stores the journal thus received, and a reflect section which writes into said real volume the write data stored in said journal information section, in the order of sequence number.

* * * * *